(12) United States Patent
Iida (10) Patent No.: US 10,879,507 B2
(45) Date of Patent: Dec. 29, 2020

(54) ONBOARD BATTERY

(71) Applicant: SUBARU CORPORATION, Tokyo (JP)

(72) Inventor: Minoru Iida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 188 days.

(21) Appl. No.: 16/221,247

(22) Filed: Dec. 14, 2018

(65) Prior Publication Data

US 2019/0305274 A1 Oct. 3, 2019

(30) Foreign Application Priority Data

Mar. 27, 2018 (JP) .................... 2018-059292

(51) Int. Cl.
| | | |
|---|---|---|
| *H01M 2/10* | (2006.01) | |
| *H01M 2/12* | (2006.01) | |
| *B60K 1/04* | (2019.01) | |
| *B62D 21/15* | (2006.01) | |
| *B60L 3/00* | (2019.01) | |

(52) U.S. Cl.
CPC ............. *H01M 2/1083* (2013.01); *B60K 1/04* (2013.01); *B60L 3/0007* (2013.01); *B62D 21/152* (2013.01); *H01M 2/1077* (2013.01); *B60K 2001/0416* (2013.01); *H01M 2220/20* (2013.01)

(58) Field of Classification Search
CPC . H01M 2/02; H01M 2/12; H01M 2/10; B60K 1/04
See application file for complete search history.

(56) References Cited

U.S. PATENT DOCUMENTS

2013/0295419 A1* 11/2013 Kwon .................. H01M 10/48
429/10

FOREIGN PATENT DOCUMENTS

| GB | 2349745 A1 * | 11/2000 | ............. H01H 35/14 |
| JP | 2017-225286 A | 12/2017 | |

OTHER PUBLICATIONS

Machine Translation of: JP 2017/225286, Minoru, Dec. 21, 2017.*

* cited by examiner

*Primary Examiner* — Kenneth J Douyette
(74) *Attorney, Agent, or Firm* — McGinn I.P. Law Group, PLLC.

(57) ABSTRACT

An onboard battery includes a battery module, a housing case, and a detector. In the battery module, a battery cell is disposed. The housing case has a through hole and houses the battery module. The detector includes a fixture portion fixed to the battery module and an elastically deformable portion that is elastically deformable. When an impact is applied and the battery module and the detector are displaced relative to the housing case by a certain amount or larger, the elastically deformable portion is elastically deformed to pass through the through hole.

20 Claims, 8 Drawing Sheets

FIG. 11

ONBOARD BATTERY

CROSS-REFERENCE TO RELATED APPLICATIONS

The present application claims priority from Japanese Patent Application No. 2018-059292 filed on Mar. 27, 2018, the entire contents of which are hereby incorporated by reference.

BACKGROUND

1. Technical Field

The present invention relates to a technical field regarding an onboard battery that is to be mounted on a vehicle such as an automobile.

2. Related Art

Various vehicles, such as automobiles, are provided with onboard batteries for supplying electric power to electric motors and various other electrical component parts.

In recent years, in particular, vehicles that use electric power as motive power, such as electric vehicles (EVs) and hybrid electric vehicles (HEVs), are becoming widely used. These fully or partly electrically powered vehicles are provided with onboard batteries that have high electricity storage function.

An onboard battery is made up of a housing case and a battery module housed in the housing case. A battery module contains, for example, an arrangement of battery cells (secondary batteries), such as nickel metal hydride batteries or lithium ion batteries. Furthermore, in some of the onboard batteries that are mounted in electric vehicles and the like, multiple battery modules are housed in a housing case and the individual battery cells of the battery modules are coupled in series or parallel in order to obtain high electricity storage function.

Such a battery module is designed to have a firm structure to safely protect the battery cells even in the case where the battery cells receive large impact due to collision of the vehicle. However, should large impact due to collision be exerted on contents of a battery module, there will be a risk that various portions in the battery module may undergo permanent deformation, so that design dimensions cannot be maintained. In the worst case, the battery module will become unable to satisfy its authentic performance requirements, so that sometimes the battery module can no longer continue to be used.

However, since battery modules have a firm structure as mentioned above, mere external visual inspection cannot determine whether a battery module has received large impact and it is necessary to carry out management of the battery modules of a vehicle associated with the collision history of the vehicle.

The battery modules that have been removed from vehicles need to be managed in association with manually recorded history of impact caused by collision. However, there is a risk of a human error resulting in the reuse of a battery module that has a history of receiving an impact.

In order to prevent the reuse of a battery module that has a history of receiving impact as mentioned above, some onboard batteries are configured to be provided with an impact detector that detects the magnitude of impact force and a plug holder that holds a service plug, and when the impact detector detects a magnitude of impact that is greater than a certain magnitude, a hold state of the service plug maintained by the plug holder is removed to cut off a high-voltage circuit (see, e.g., Japanese Unexamined Patent Application Publication (JP-A) No. 2017-225286).

SUMMARY OF THE INVENTION

An aspect of the present invention provides an onboard battery including a battery module in which a battery cell is disposed, a housing case that has at least one through hole and that houses the battery module, and at least one detector that includes a fixture portion fixed to the battery module and an elastically deformable portion that is elastically deformable. When an impact is applied and the battery module and the at least one detector are displaced relative to the housing case by a certain amount or larger, the elastically deformable portion is elastically deformed to pass through the at least one through hole.

DETAILED DESCRIPTION

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted. In an onboard battery described in JP-A No. 2017-225286, the structure for preventing the reuse of a battery module is complicated, giving rise to a disadvantage of increased production cost of the onboard battery.

Therefore, it is desirable to provide an onboard battery that prevents the reuse of a battery module that has a history of receiving a large impact, while adopting a simple configuration so that increased cost does not result.

Figure 1:
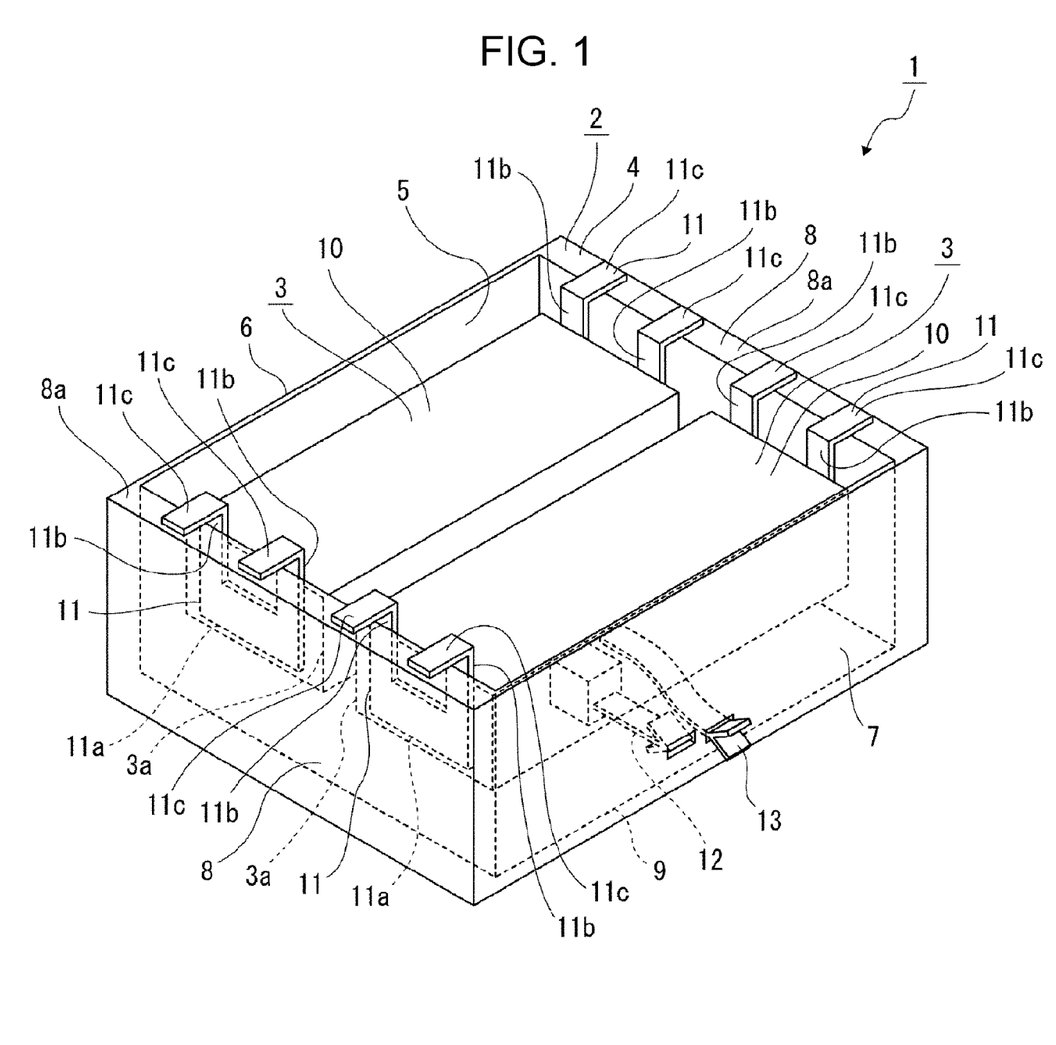
FIG. 1 is a schematic perspective view of an example of an onboard battery, illustrating, together with FIGS. 2 to 12, an onboard battery according to an example of the present invention.

An onboard battery 1 includes a housing case 2 and, for example, two battery modules 3 and 3 (see FIG. 1). The onboard battery 1 is disposed, for example, in a luggage compartment of a vehicle. The number of battery modules 3 provided in the onboard battery 1 is any given number and may also be one or three or more.

The housing case 2 has a housing portion 4 that has an upper opening and a lid (not illustrated) that closes the opening of the housing portion 4 from above. An internal space of the housing portion 4 is formed as an arrangement space 5.

The housing portion 4 has a front wall portion 6 positioned in rear of, that is, at a rear side of, a rear seat of a vehicle, a rear wall portion 7 positioned in rear of the front wall portion 6, side wall portions 8 and 8 positioned apart from each other in left-right directions, and a bottom wall portion 9 that faces in up-down directions.

The rear wall portion 7 has a first through hole 7a and a second through hole 7b that both extend through the rear wall portion 7 in front-rear directions and are juxtaposed in the left-right directions. The second through hole 7b is slightly below, that is, slightly at a lower side of, the first through hole 7a.

The battery modules 3 and 3 are housed in the housing case 2, for example, in an arrangement in which the battery modules 3 and 3 are aligned in the front-rear directions. Each battery module 3 includes a laterally elongated case body 10 having a substantially rectangular parallelepiped shape and multiple battery cells (not illustrated) housed within the case body 10.

The battery modules 3 housed in the housing case 2 are, for example, suspended in the housing case 2 by suspension members 11 and 11.

Each suspension member 11 has a flat platy coupling surface portion 11a that faces in the left-right directions, arm portions 11b and 11b protruding upward from a front end portion and a rear end portion of the coupling surface portion 11a, and coupling lug portions 11c and 11c protruding leftward or rightward from upper end portions of the arm portions 11b and 11b.

A suspension member 11 on one of the left and right sides is coupled and fixed at its coupling surface portion 11a to a corresponding one of two side surfaces 3a of a battery module 3. The coupling surface portion 11a of a suspension member 11 on the other side is coupled and fixed to the other side surface 3a of the battery module 3. The coupling lug portions 11c, 11c, . . . of the suspension members 11, 11, . . . are coupled and fixed to upper surfaces 8a and 8a of the side wall portions 8 and 8 of the housing portion 4 of the housing case 2. Therefore, the battery modules 3 are suspended within the housing portion 4 via the suspension members 11 and 11, and a clearance space is formed between lower surfaces 3b of the battery modules 3 and an upper surface 9a of the bottom wall portion 9.

Although the battery modules 3 are fixed to the housing case 2 via the suspension members 11 and 11, the battery modules 3 will be displaced relative to the housing case 2 if the onboard battery 1 should receive a large impact due to collision of the vehicle. The displacement of the battery modules 3 relative to the housing case 2 occurs in a manner in which the battery modules 3 are caused to swing as the coupling lug portions 11c, 11c, . . . of the suspension members 11 and 11 acting as support points. For example, in the case of a so-called rear collision where the vehicle is struck from behind, the battery modules 3 are displaced in such a direction as to move rearward relative to the housing case 2. In the case of a so-called frontal collision where the vehicle is struck from front, the battery modules 3 are displaced in such a direction as to move forward relative to the housing case 2. Furthermore, in the case of a so-called side collision where the vehicle is struck from left, each battery module 3 is displaced in such a direction as to move leftward relative to the housing case 2. In the case of a so-called side collision where the vehicle is struck from right, each battery module 3 is displaced in such a direction as to move rightward relative to the housing case 2.

Note that when an onboard battery 1 that includes multiple battery modules 3 and 3 as described above receives impact due to collision of the vehicle, all the battery modules 3 and 3 behave in the same manner, that is, the battery modules 3 and 3 are displaced in the same direction relative to the housing case 2.

One of the two battery modules 3 is provided with a first detector 12 and a second detector 13.

Figure 2:
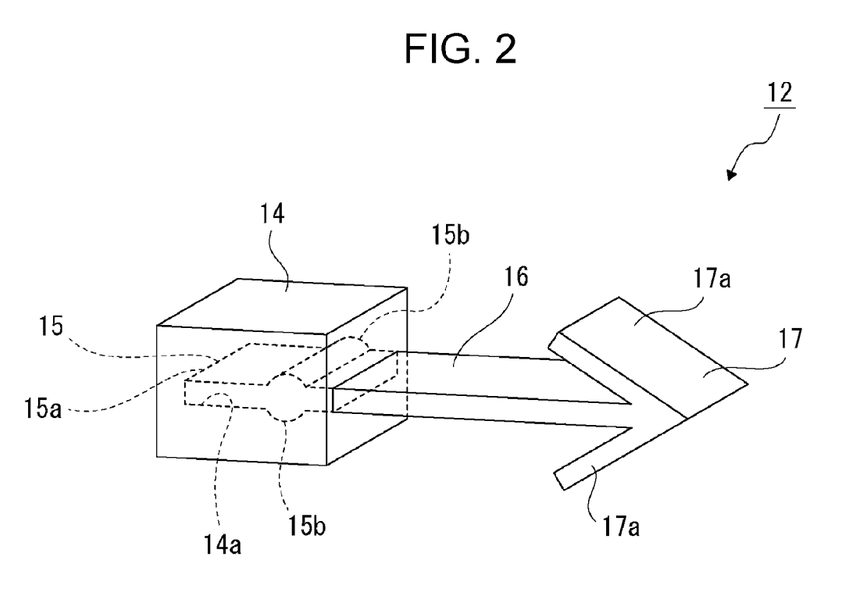
FIG. 2 is a perspective view of a first detector.

The first detector 12 is made up of a fixture portion 14, an insert portion 15, a connecting portion 16, and an elastically deformable portion 17 (see FIG. 2).

The fixture portion 14 has a block shape and is provided with a support hole 14a that has a rear opening.

The insert portion 15 is a portion that is inserted into the support hole 14a. The insert portion 15 has a platy portion 15a that has a flat platy shape and that faces in the up-down directions and protuberances 15b and 15b that are partially protruded upward and downward from an upper surface and a lower surface, respectively, of the platy portion 15a. The upper protuberance 15b has an arc-shape upper surface that is protruded upward and the lower protuberance 15b has an arc-shape lower surface that is protruded downward.

The connecting portion 16 has a flat platy shape that faces in the up-down directions and that is continuous with a rear end of the platy portion 15a of the insert portion 15.

The elastically deformable portion 17 is made up of a pair of elastic portions 17a and 17a that are protruded in different directions from a rear end portion of the connecting portion 16. One of the elastic portions 17a is protruded obliquely forward upward from the connecting portion 16 and the other elastic portion 17a is protruded obliquely forward downward from the connecting portion 16. The elastic portions 17a and 17a are elastically deformable in such directions as to move toward and away from each other in the up-down directions.

The insert portion 15 is inserted into the support hole 14a of the fixture portion 14 from rear. The support hole 14a has a portion that is shaped corresponding to the shape of the protuberances 15b and 15b of the insert portion 15. The thus-shaped portion receives the insertion of the protuberances 15b and 15b of the insert portion 15. Therefore, although the insert portion 15 is supported by the fixture portion 14, the engagement of the protuberances 15b and 15b with the fixture portion 14 is discontinued and the insert portion 15 is pulled out of the fixture portion 14 when a large force acts on the insert portion 15 and the fixture portion 14 in such a direction that the insert portion 15 and the fixture portion 14 will move away from each other in the front-rear directions.

Figure 3:
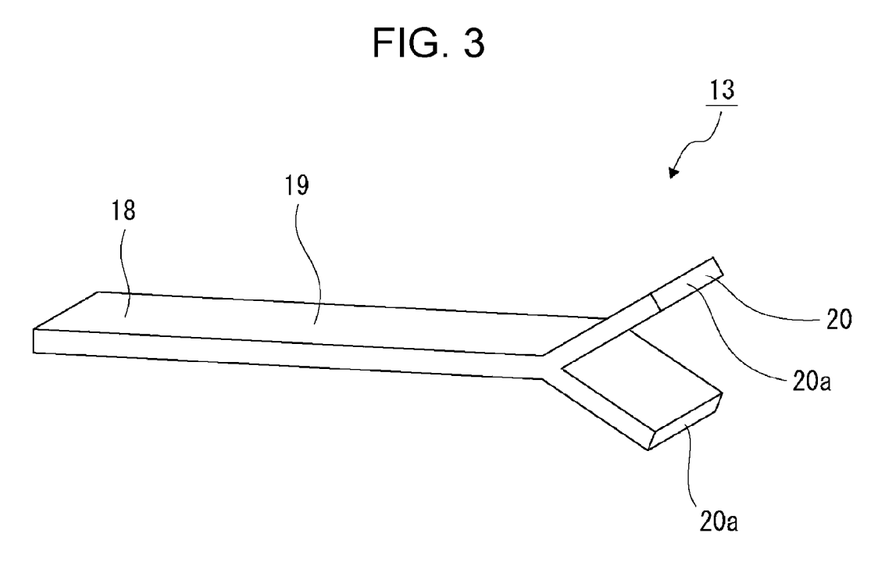
FIG. 3 is a perspective view of a second detector.

The second detector 13 is made up of a fixture portion 18, a connecting portion 19, and an elastically deformable portion 20 (see FIG. 3).

The fixture portion 18 is provided as a front end portion of the second detector 13 and has a flat platy shape that faces in the up-down directions.

The connecting portion 19 is continuous with a rear end of the fixture portion 18 and has a flat platy shape that faces in the up-down directions. The connecting portion 19 is elastically deformable.

The elastically deformable portion 20 is made up of a pair of elastic portions 20a and 20a that are protruded in different directions from a rear end portion of the connecting portion 19. One of the elastic portions 20a is protruded obliquely rearward upward from the connecting portion 19 and the other elastic portion 20a is protruded obliquely rearward downward from the connecting portion 19. The elastic portions 20a and 20a are elastically deformable in such directions as to move toward and away from each other in the up-down directions.

Figure 4:
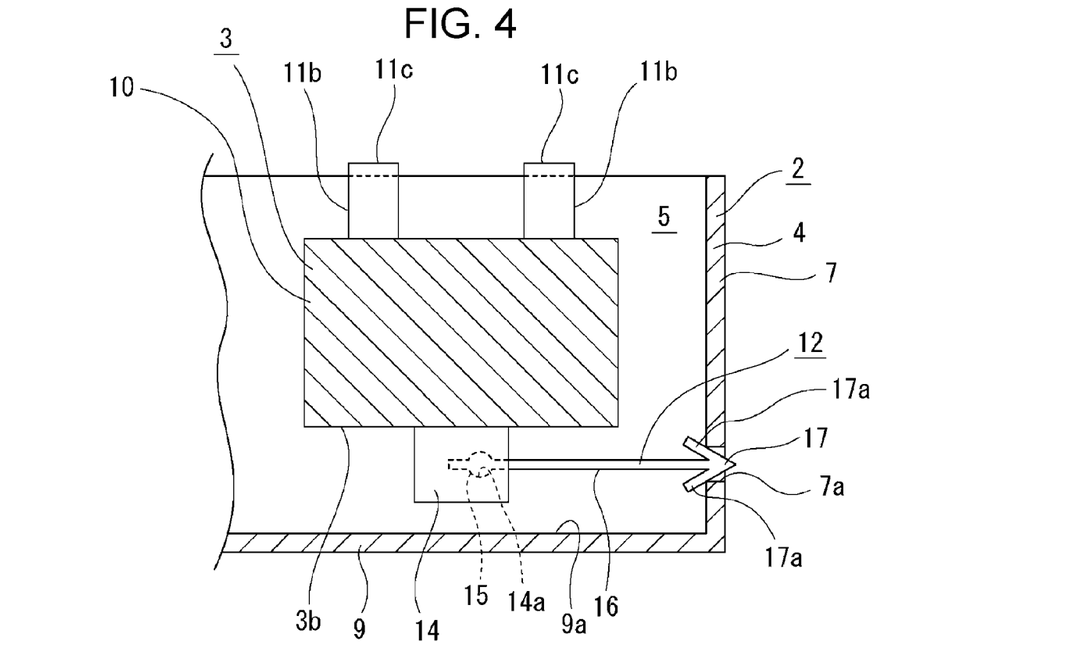
FIG. 4 is a sectional view illustrating a state of the first detector and its surrounding portions before impact is given.

As for the first detector 12, the fixture portion 14, with the insert portion 15 supported by the fixture portion 14, is fixed to the lower surface 3b of the battery module 3, for example, to a central portion thereof (see FIG. 4). With the fixture portion 14 fixed to the battery module 3, an end portion on a connecting portion 16 side of the elastically deformable portion 17 of the first detector 12 is inserted from front into the first through hole 7a formed in the rear wall portion 7 of the housing case 2.

Figure 5:
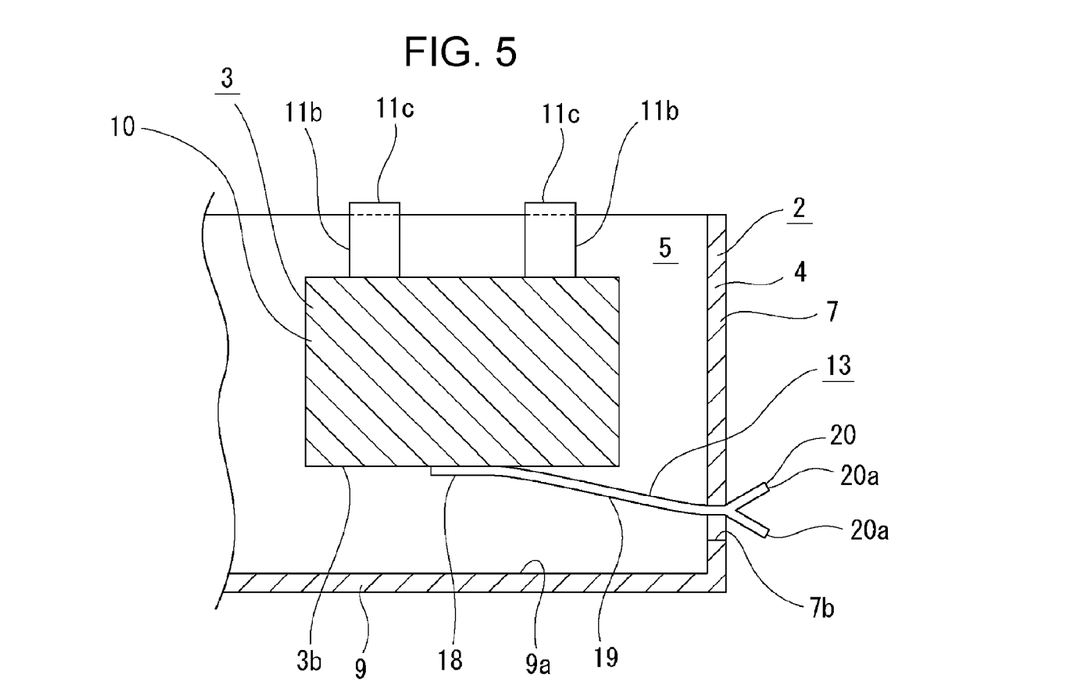
FIG. 5 is a sectional view illustrating a state of the second detector and its surrounding portions before impact is given.

The second detector 13 is disposed side by side with the first detector 12 in the left-right directions and the fixture portion 18 of the second detector 13 is fixed to the lower surface 3b of the battery module 3, for example, to a central portion thereof (see FIG. 5). With the fixture portion 18 fixed to the battery module 3, the second detector 13 is inserted into the second through hole 7b formed in the rear wall portion 7 of the housing case 2 so that the connecting portion 19 extends through the second through hole 7b and the elastically deformable portion 20 is located in rear of the rear wall portion 7. At this time, the connecting portion 19 is in such a deformed state that a rear end portion thereof is located below a front end portion thereof.

Figure 6:
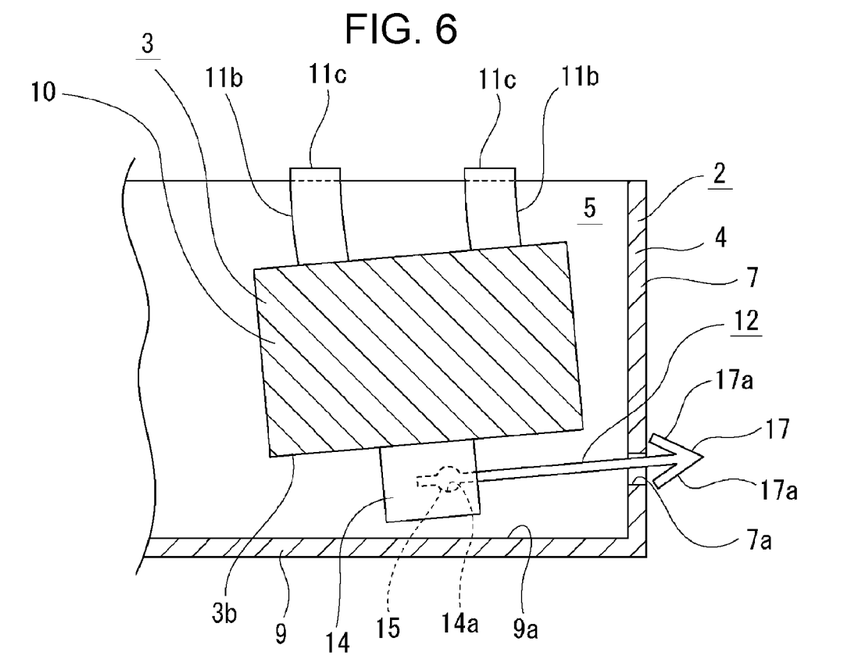
FIG. 6 is a sectional view illustrating a state of the first detector and its surrounding portions when a large impact is given.

According to the onboard battery 1 configured as described above, if a vehicle equipped with the onboard battery 1 should be struck from behind and a large impact should be applied to the battery modules 3 and 3, the battery modules 3 and 3 and the first detector 12 and the second detector 13 that are fixed to the battery module 3 will be displaced rearward relative to the housing case 2. When the first detector 12 is displaced rearward, the elastic portions 17a and 17a of the elastically deformable portion 17 are elastically deformed in such directions as to approach each other while sliding on an opening edge of the first through hole 7a and the elastically deformable portion 17 moves through the first through hole 7a from front to rear, and the elastic portions 17a and 17a are elastically restored (see FIG. 6). At this time, the second detector 13 is displaced rearward together with the rearward displacement of the battery module 3 but remains in a state in which the elastically deformable portion 20 of the second detector 13 is located in rear of the rear wall portion 7.

Note that although impact may sometimes result in deformation of portions of the onboard battery 1, FIGS. 6 to 9 illustrate portions in an undeformed state for the sake of easy understanding.

Figure 7:
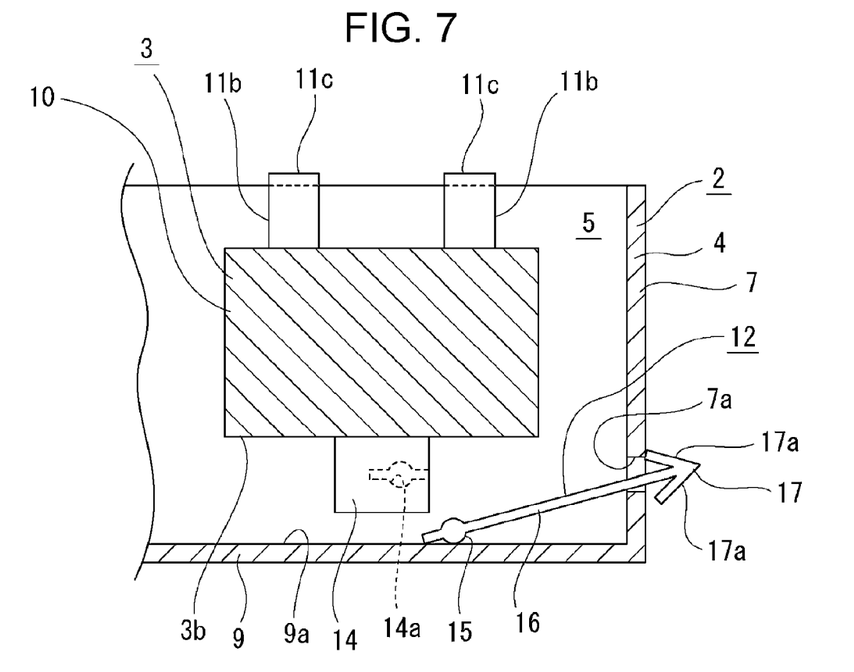
FIG. 7 is a sectional view illustrating a state of the first detector and its surrounding portions at reduction of impact.

When a collision phenomenon ceases and the impact force reduces, the battery modules 3 and 3, the first detector 12, and the second detector 13 are displaced forward relative to the housing case 2, each returning toward the original state by the amount of elastic deformation, with plastic deformation remaining. However, the elastically restored elastic portions 17a and 17a of the first detector 12 come into contact with the rear surface of the rear wall portion 7 and therefore restrict the forward displacement of the first detector 12.

While the first detector 12 is restricted from being displaced forward, the battery module 3 is displaced forward. Therefore, the fixture portion 14 of the first detector 12 is displaced forward together with the battery module 3, and the insert portion 15 is released out of the fixture portion 14 (see FIG. 7). At this time, the second detector 13 is displaced forward together with the forward displacement of the battery module 3 but the state in which the elastically deformable portion 20 of the second detector 13 is located in rear of the rear wall portion 7 remains unchanged.

As described above, when the vehicle is struck from behind and a large impact is applied to the battery modules 3 and 3, the elastically deformable portion 17 of the first detector 12 moves through the first through hole 7a to be located in rear of the rear wall portion 7. Therefore, although the entire first detector 12 is located within the housing case 2 before a collision, the presence of a portion of the first detector 12 is visually recognizable outside (at the rear side) of the housing case 2 after a collision. This makes it possible to objectively recognize that the vehicle was struck from behind and the onboard battery 1 received a large impact. Hence, the first detector 12 functions as a detector for a rear collision where the vehicle is struck from behind.

On the other hand, if the vehicle equipped with the onboard battery 1 should be struck from front resulting in a large impact on the battery modules 3 and 3, the battery modules 3 and 3 and the first detector 12 and the second detector 13 that are fixed to the battery module 3 will be displaced forward relative to the housing case 2. When the second detector 13 is displaced forward, the elastic portions 20a and 20a of the elastically deformable portion 20 are elastically deformed in such directions as to approach each other while sliding on an opening edge of the second through hole 7b and the elastically deformable portion 20 moves through the second through hole 7b from rear to front, and the elastic portions 20a and 20a are elastically restored (see FIG. 8). Furthermore, the originally deformed connecting portion 19 of the second detector 13 restores itself from the defamed state and assumes a substantially horizontal state. At this time, the first detector 12 is displaced forward together with the forward displacement of the battery module 3 but remains in a state in which the elastically deformable portion 17 of the first detector 12 is located within the housing case 2.

Figure 8:
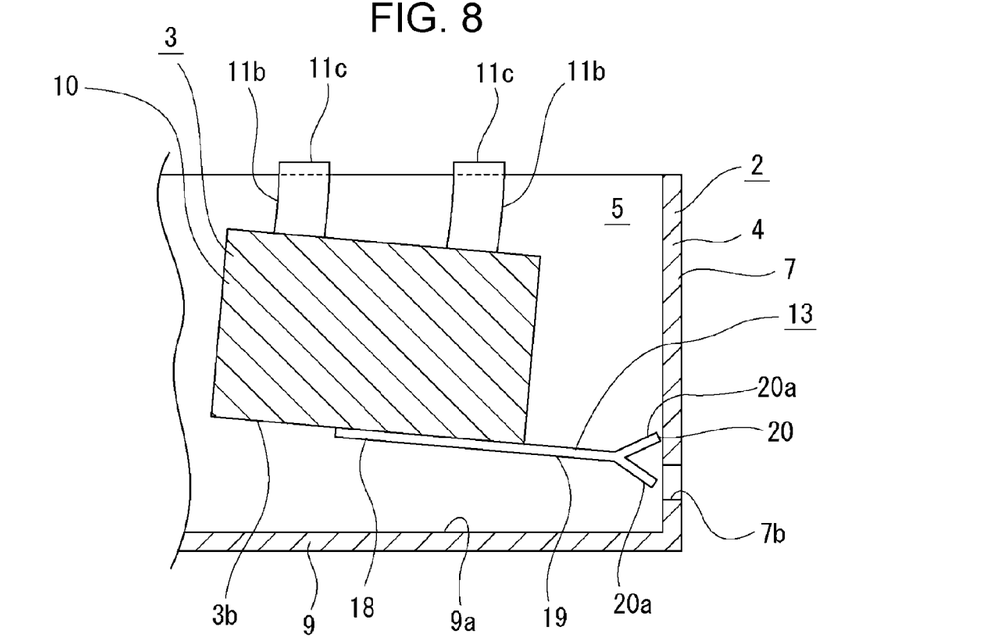
FIG. 8 is a sectional view illustrating a state of the second detector and its surrounding portions when a large impact is given.

As the collision phenomenon ceases and the impact force reduces, the battery modules 3 and 3, the first detector 12, and the second detector 13 are displaced rearward relative to the housing case 2, each returning toward the original state by the amount of elastic deformation with plastic deformation remaining. However, the elastically restored elastic portions 20a and 20a of the second detector 13 come into contact with the front surface of the rear wall portion 7 and therefore restrict the rearward displacement of the second detector 13.

Figure 9:
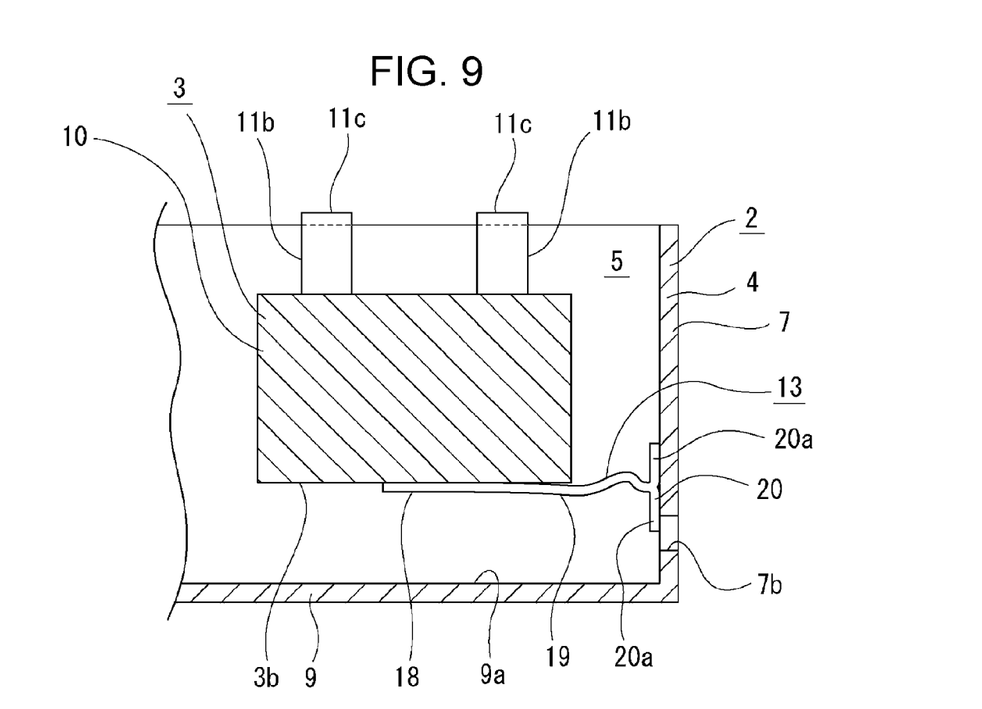
FIG. 9 is a sectional view illustrating a state of the second detector and its surrounding portions at reduction of impact.

While the second detector 13 is restricted from being displaced rearward, the battery module 3 is displaced rearward, and therefore the connecting portion 19 of the second detector 13 is deformed again (see FIG. 9). At this time, the first detector 12 is displaced rearward together with the rearward displacement of the battery module 3 but the state in which the first detector 12 is located within the housing case 2 remains unchanged.

As described above, when the vehicle is struck from front and a large impact is applied to the battery modules 3 and 3, the elastically deformable portion 20 of the second detector 13 moves through the second through hole 7b and is located in front of the rear wall portion 7 within the housing case 2. Therefore, although a portion of the second detector 13 is located outside (at the rear side) of the housing case 2 before a collision, the presence of the second detector 13 outside (at the rear side) of the housing case 2 is not visually recognizable after a collision. This makes it possible to objectively recognize that the vehicle was struck from front and the onboard battery 1 received a large impact. Hence, the second detector 13 functions as a detector for a frontal collision where the vehicle is struck from front.

As described above, according to the onboard battery 1, it can be visually determined whether a battery module 3 has a history of receiving a large impact by visually recognizing from outside a change due to an impact in the position of the elastically deformable portion 17 or the elastically deformable portion 20 relative to the housing case 2. Therefore, the battery module 3 having a history of receiving a large impact can be prevented from being reused merely by adopting a simple configuration, without increasing costs.

Furthermore, the first detector 12 and the second detector 13 include the elastically deformable portions 17 and 20 each made up of two elastic portions 17a and 17a or 20a and 20a that are protruded from an end portion of the connecting portion 16 or 19 in such directions as to become farther away from each other. The two elastic portions 17a and 17a or 20a and 20a of the elastically deformable portion 17 or 20 of the first or second detector 12 or 13 are elastically deformable in such directions as to move toward and away from each other.

Therefore, since each of the elastically deformable portions 17 and 20 is made up of the two elastic portions 17a and 17a or 20a and 20a that are elastically deformable in such directions as to move toward and away from each other, the first detector 12 and the second detector 13 are simple in structure and allow a history of impact to be detected without increasing the production cost.

Furthermore, the first detector 12 and the second detector 13 provided in the onboard battery 1 have different shapes and realize detection of impact according to the directions in which impact is exerted.

Therefore, since the first detector 12 and the second detector 13 allow the histories of impacts exerted from different directions to be detected, it becomes possible to improve the detection performance with regard to the history of impact.

Furthermore, the rear wall portion 7, a wall portion of the housing case 2, is provided with the first through hole 7a and the second through hole 7b, and the elastically deformable portion 17 of the first detector 12 and the elastically deformable portion 20 of the second detector 13 are able to pass through the first through hole 7a and the second through hole 7b, respectively.

Therefore, since the first detector 12 and the second detector 13 are positioned on the same wall portion, that is, the rear wall portion 7, it suffices that a space for disposing the first detector 12 and the second detector 13 within the housing case 2 is provided at the side of the same wall portion. Hence, size reduction of the onboard battery 1 can be achieved in addition to detection of the history of impact.

Furthermore, since the first detector 12 and the second detector 13 are positioned side by side in the left-right directions, the space for disposing the first detector 12 and the second detector 13 within the housing case 2 is reduced. Hence, further size reduction of the onboard battery 1 can be achieved in addition to detection of the history of impact.

Still further, the suspension members 11 and 11 include portions fixed to the housing case 2 and other portions fixed to the battery modules 3, and the battery modules 3 housed in the housing case 2 are suspended by the suspension members 11 and 11.

Therefore, no friction force is generated between the battery modules 3 and the housing case 2. Hence, when receiving an impact of a certain magnitude or greater, the battery modules 3, the first detector 12, and the second detector 13 are easily displaced relative to the housing case 2, and therefore the history of impact can be reliably detected.

Although in the foregoing example, the rear wall portion 7 is provided with the first through hole 7a and the second through hole 7b through which the first detector 12 and the second detector 13 respectively pass. Alternatively, it is also permissible to adopt a configuration in which the front wall portion 6 is provided with a first through hole 6a and a second through hole 6b through which the first detector 12 and the second detector 13 respectively pass (see FIG. 10).

Figure 10:
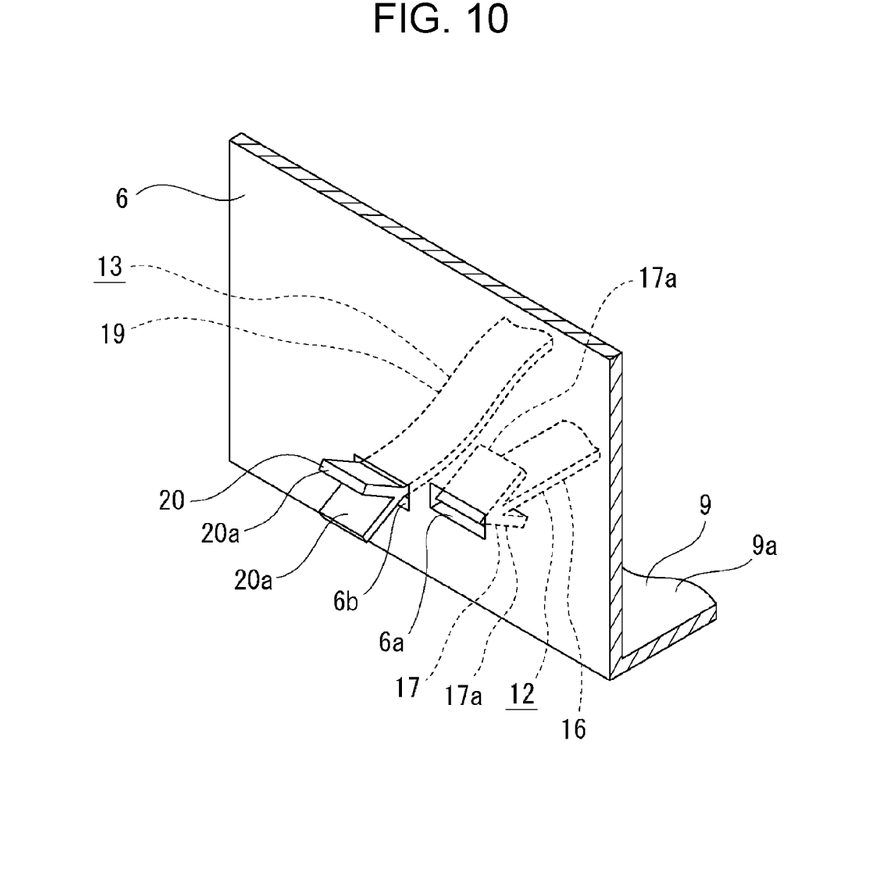
FIG. 10 is a perspective view illustrating an example in which a front wall portion is provided with through holes.

According to this configuration, when the vehicle is struck from front, the first detector 12 having been entirely positioned within the housing case 2 prior to the collision has its elastically deformable portion 17 passing through the first through hole 7a from rear to front due to the collision, and the presence of a portion of the first detector 12 outside (at the front side) of the housing case 2 can be visually recognized. Therefore, the first detector 12 functions as a detector for a frontal collision where the vehicle is struck from front.

On the other hand, when the vehicle is struck from behind, the elastically deformable portion 20 of the second detector 13, which has been positioned outside (at the front side) of the housing case 2 before the collision, passes through the second through hole 7b from front to rear due to the collision, and the presence of the second detector 13 cannot be visually recognized outside of the housing case 2. Therefore, the second detector 13 functions as a detector for a rear collision where the vehicle is struck from behind.

Figure 11:
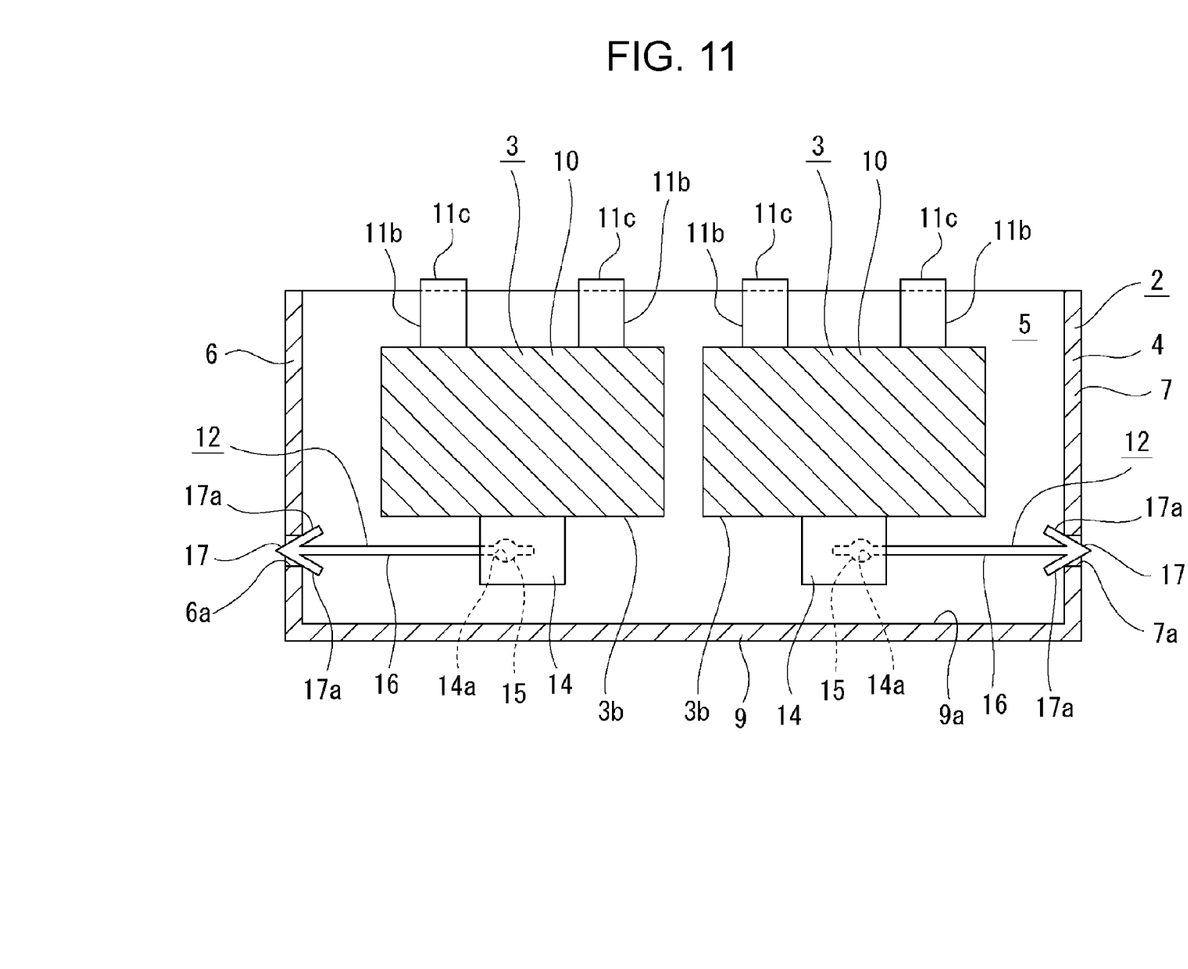
FIG. 11 is a sectional view illustrating an example in which a front wall portion and a rear wall portion are each provided with a through hole and two first detectors are provided corresponding to the through holes.

Furthermore, the onboard battery 1 may also have a configuration in which the rear wall portion 7 and the front wall portion 6 are provided with a through hole 7a and a through hole 6a, respectively, and first detectors 12 and 12 pass through the through holes 7a and 6a, respectively (see FIG. 11).

According to this configuration, when the vehicle is struck from front, one of the first detectors 12 passes through the through hole 6a from rear to front, and the presence of a portion of that first detector 12 can be visually recognized outside (at the front side) of the housing case 2. Therefore, the aforementioned one of the first detectors 12 functions as a detector for a frontal collision where the vehicle is struck from front. Furthermore, when the vehicle is struck from behind, the other first detector 12 passes through the through hole 7a from front to rear, and the presence of a portion of that first detector 12 can be visually recognized outside (at the rear side) of the housing case 2. Therefore, the other first detector 12 functions as a detector for a rear collision where the vehicle is struck from behind.

Figure 12:
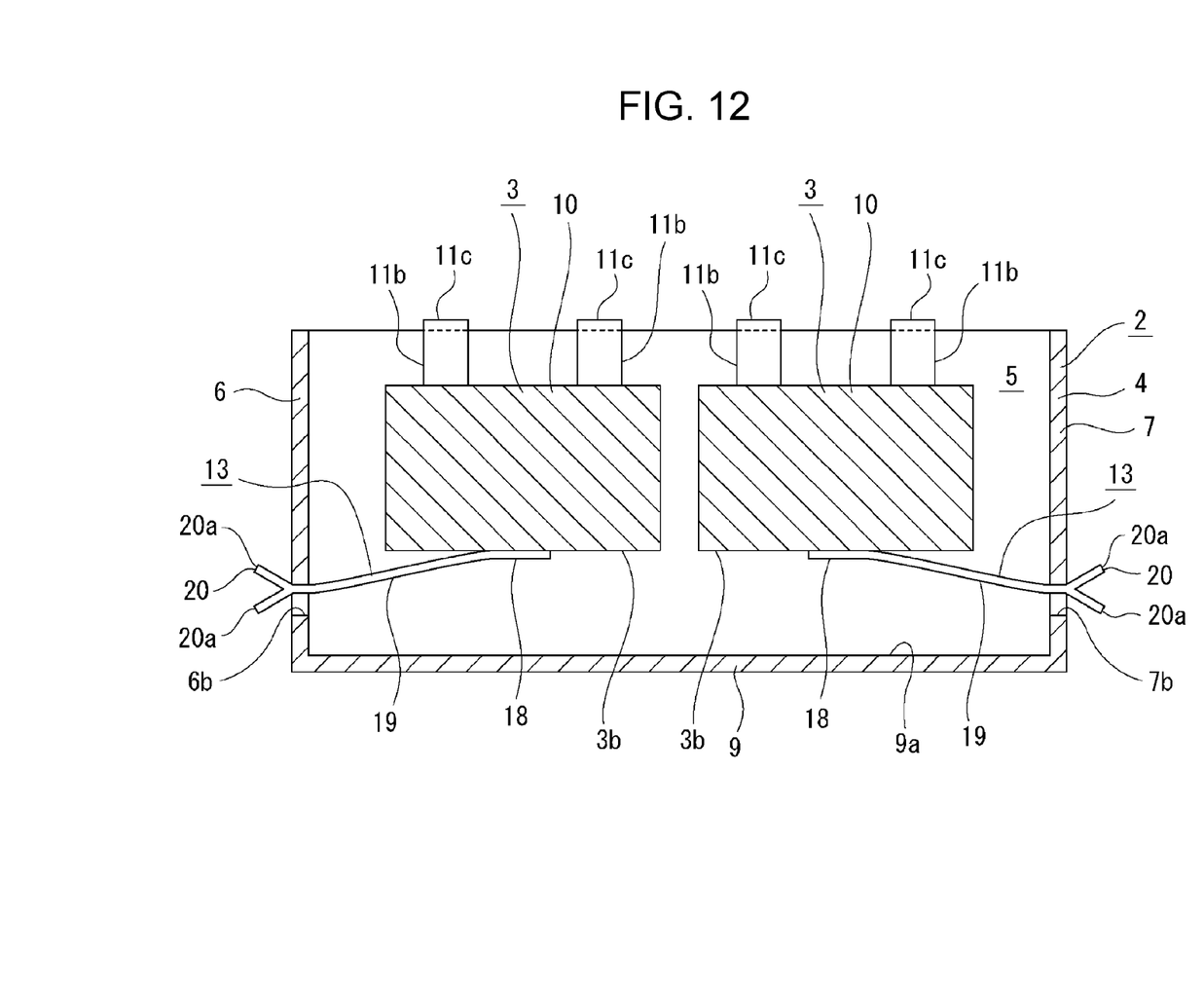
FIG. 12 is a sectional view illustrating an example in which a front wall portion and a rear wall portion are each provided with a through hole and two second detectors are provided corresponding to the through holes.

Note that, alternatively, it is also permissible to adopt a configuration in which second detectors 13 and 13 pass through the through holes 7b and 6b, respectively (see FIG. 12). According to this configuration, one of the second detectors 13 that passes through the through hole 7b functions as a detector for a rear collision and the other second detector 13 that passes through the through hole 6b functions as a detector for a frontal collision.

Furthermore, the onboard battery 1 may also have a configuration in which one of the two side wall portions 8 is provided with two through holes through which a first detector 12 and a second detector 13 respectively pass through. In this configuration, the first detector 12 and the second detector 13 both function as detectors for side collisions.

In the configuration in which one of the side wall portions 8 is provided with two through holes, positioning the first detector 12 and the second detector 13 side by side in the front-rear directions will reduce the space for disposing the first detector 12 and the second detector 13 within the housing case 2, and therefore size reduction of the onboard battery 1 can be achieved in addition to detection of the history of impact.

Furthermore, it is also possible to adopt a configuration in which the two side wall portions 8 and 8 are provided with a through hole through which a first detector 12 passes and a through hole through which a second detector 13 passes, respectively, and the first detector 12 and the second detector 13 both function as detectors for side collisions.

Note that since the onboard battery 1, even when provided with multiple battery modules 3, makes it possible to determine whether the onboard battery 1 has a history of receiving a large impact by visually recognizing from outside a change in the position of the first detector 12 or the second detector 13 relative to the housing case 2, there is no need to fix a first detector 12 and a second detector 13 to each of the battery modules 3.

Therefore, since it is possible to determine whether the onboard battery 1 has a history of receiving a large impact while minimizing the number of first and second detectors 12 and 13, it is possible to prevent the reuse of a battery module 3 that has a history of receiving an impact, while simplifying the structure.

Furthermore, although in the foregoing example, the first detector 12 and the second detector 13 are fixed to a central portion of the lower surface 3b of a battery module 3, the first detector 12 and the second detector 13 may be fixed to any portion of the battery module 3 provided in the onboard battery 1.

Still further, although in the foregoing example, the first detector 12 or the second detector 13 is fixed to a battery module 3, the first detector 12 or the second detector 13 may be fixed to a structural part other than the battery modules 3 which is provided within the housing case 2 and which is displaceable relative to the housing case 2 by a large impact. The first detector 12 or the second detector 13 may be reduced in size and fixed to a structural part that has a small mass, and a dedicated detection site may be set to detect history of impact.

It should be noted that fixation of a first detector 12 or a second detector 13 to a battery module 3 means fixation of the first detector 12 or the second detector 13 to a structural part that has a large mass, and therefore application of impact likely causes a large displacement, allowing reliable detection of a history of impact.

The invention claimed is:

1. An onboard battery, comprising:
   a battery module in which a battery cell is disposed;
   a housing case that has a through hole in a side of the housing case and that houses the battery module; and
   a detector including:
      a fixture portion fixed to the battery module; and
      an elastically deformable portion that is elastically deformable and configured to pass through the through hole by deforming a shape of the elastically deformable portion,
   wherein, when an impact is applied and the battery module and the detector are displaced relative to the housing case by a certain amount or larger, the elastically deformable portion is elastically deformed to pass through the through hole.

2. The onboard battery according to claim 1, wherein the detector is provided with a connecting portion that connects the fixture portion and the elastically deformable portion,
   wherein the elastically deformable portion comprises two elastic portions that are protruded from an end portion of the connecting portion in such directions as to become apart from each other, and
   wherein the two elastic portions are elastically deformable in such directions as to move toward and away from each other.

3. The onboard battery according to claim 1, wherein the detector comprises a first detector and a second detector that are different in shape from each other and that each perform detection according to a direction of the applied impact.

4. The onboard battery according to claim 2, wherein the detector comprises a first detector and a second detector that are different in shape from each other and that each perform detection according to a direction of the applied impact.

5. The onboard battery according to claim 3, wherein the housing case is formed by a plurality of wall portions,
   wherein the through hole comprises two through holes,
   wherein one of the wall portions is provided with the two through holes, and
   wherein an elastically deformable portion of the first detector and an elastically deformable portion of the second detector a capable of passing through corresponding holes of the two through holes.

6. The onboard battery according to claim 4, wherein the housing case is formed by a plurality of wall portions,
   wherein the through hole comprises two through holes,
   wherein one of the wall portions is provided with the two through holes, and
   wherein an elastically deformable portion of the first detector and an elastically deformable portion of the second detector are capable of passing through corresponding holes of the two through holes.

7. The onboard battery according to claim 5, wherein the first detector and the second detector are disposed side by side in a left-right direction or a front-rear direction.

8. The onboard battery according to claim 6, wherein the first detector and the second detector are disposed side by side in a left-right direction or a front-rear direction.

9. The onboard battery according to claim 1, further comprising:
   a suspension member of which a portion is fixed to the housing case and another portion is fixed to the battery module, wherein the battery module is housed in the housing case in such a manner that the battery module is suspended in the housing case by the suspension member.

10. The onboard battery according to claim 2, further comprising:
a suspension member of which a portion is fixed to the housing case and another portion is fixed to the battery module,
wherein the battery module is housed in the housing case in such a manner that the battery module is suspended in the housing case by the suspension member.

11. The onboard battery according to claim 3, further comprising:
a suspension member of which a portion is fixed to the housing case and another portion is fixed to the battery module,
wherein the battery module is housed in the housing case in such a manner that the battery module is suspended in the housing case by the suspension member.

12. The onboard battery according to claim 4, further comprising:
a suspension member of which a portion is fixed to the housing case and another portion is fixed to the battery module,
wherein the battery module is housed in the housing case in such a manner that the battery module is suspended in the housing case by the suspension member.

13. The onboard battery according to claim 5, further comprising:
a suspension member of which a portion is fixed to the housing case and another portion is fixed to the battery module,
wherein the battery module is housed in the housing case in such a manner that the battery module is suspended in the housing case by the suspension member.

14. The onboard battery according to claim 6, further comprising:
a suspension member of which a portion is fixed to the housing case and another portion is fixed to the battery module,
wherein the battery module is housed in the housing case in such a manner that the battery module is suspended in the housing case by the suspension member.

15. The onboard battery according to claim 7, further comprising:
a suspension member of which a portion is fixed to the housing case and another portion is fixed to the battery module,
wherein the battery module is housed in the housing case in such a manner that the battery module is suspended in the housing case by the suspension member.

16. The onboard battery according to claim 8, further comprising:
a suspension member of which a portion is fixed to the housing case and another portion is fixed to the battery module,
wherein the battery module is housed in the housing case in such a manner that the battery module is suspended in the housing case by the suspension member.

17. The onboard battery according to claim 1, wherein the elastically deformable portion comprises elastic portions, which are protruded from an end portion of a connecting portion of the battery module and the elastically deformable portion, in directions to become apart from each other.

18. The onboard battery according to claim 17, wherein the elastic portions are elastically deformable in directions as to move toward and away from each other.

19. An onboard battery, comprising:
a battery module in which a battery cell is disposed;
a housing case that has a through hole in a side of the housing case and that houses the battery module; and
a detector including:
a fixture portion fixed to the battery module; and
an elastically deformable portion that is elastically deformable, at least a part of the elastically deformable portion or a connecting portion that connect the elastically deformable portion and the fixture portion being inserted in the through hole,
wherein, when an impact is applied and the battery module and the detector are displaced relative to the housing case by a certain amount or larger, the elastically deformable portion is elastically deformed to pass through the through hole.

20. An onboard battery, comprising:
a battery module in which a battery cell is disposed;
a housing case that has at least one through hole and that houses the battery module; and
at least one detector that comprises a fixture portion fixed to the battery module and an elastically deformable portion that is elastically deformable,
wherein, when an impact is applied and the battery module and the at least one detector are displaced relative to the housing case by a certain amount or larger, the elastically deformable portion is elastically deformed to pass through the at least one through hole,
wherein the at least one detector is provided with a connecting portion that connects the fixture portion and the elastically deformable portion,
wherein the elastically deformable portion comprises two elastic portions that are protruded from an end portion of the connecting portion in such directions as to become apart from each other, and
wherein the two elastic portions are elastically deformable in such directions as to move toward and away from each other.

* * * * *